United States Patent
Sullivan et al.

(10) Patent No.: US 10,005,158 B2
(45) Date of Patent: Jun. 26, 2018

(54) EARTH-BORING TOOLS WITH PRECISE CUTTER POCKET LOCATION AND ORIENTATION AND RELATED METHODS

(71) Applicant: Baker Hughes Incorporated, Houston, TX (US)

(72) Inventors: Eric C. Sullivan, Houston, TX (US); Kenneth R. Evans, Spring, TX (US); Kenneth A. Gibbs, Cypress, TX (US); Alan J. Massey, Houston, TX (US); James Andy Oxford, Magnolia, TX (US)

(73) Assignee: Baker Hughes Incorporated, Houston, TX (US)

( * ) Notice: Subject to any disclaimer, the term of this patent is extended or adjusted under 35 U.S.C. 154(b) by 728 days.

(21) Appl. No.: 14/564,415

(22) Filed: Dec. 9, 2014

(65) Prior Publication Data

US 2016/0158894 A1    Jun. 9, 2016

(51) Int. Cl.
| | | |
|---|---|---|
| *B23K 31/02* | (2006.01) | |
| *C21D 9/22* | (2006.01) | |
| *B23K 1/00* | (2006.01) | |
| *B23K 1/20* | (2006.01) | |
| *B23K 1/19* | (2006.01) | |
| *B23K 5/18* | (2006.01) | |
| *B23K 9/04* | (2006.01) | |
| *B23K 10/02* | (2006.01) | |

(Continued)

(52) U.S. Cl.
CPC .......... *B23K 31/025* (2013.01); *B23K 1/0008* (2013.01); *B23K 1/19* (2013.01); *B23K 5/18* (2013.01); *B23K 9/044* (2013.01); *B23K 10/027* (2013.01); *B23K 26/34* (2013.01); *C21D 9/22* (2013.01); *B23K 2201/20* (2013.01); *B23K 2203/04* (2013.01); *B23K 2203/26* (2015.10)

(58) Field of Classification Search
CPC ........ B23K 31/025; B23K 9/044; B23K 1/19; B23K 26/34; B23K 10/027; B23K 5/18; B23K 1/0008; B23K 2203/04; B23K 2201/20; B23K 2203/26; C21D 9/22
See application file for complete search history.

(56) References Cited

U.S. PATENT DOCUMENTS

| | | |
|---|---|---|
| 6,601,475 B2 | 8/2003 | Davies et al. |
| 6,698,098 B2 | 3/2004 | Griffo et al. |

(Continued)

OTHER PUBLICATIONS

International Search Report for International Application No. PCT/US2015/064603, dated Mar. 10, 2016, 3 pages.

(Continued)

*Primary Examiner* — John C Hong
(74) *Attorney, Agent, or Firm* — TraskBritt

(57) ABSTRACT

A method of forming an earth-boring tool includes forming a tool body including at least one inverted cutting element pocket, at least a portion of the at least one inverted cutting element pocket having a profile substantially matching a profile of an actual cutting element to be secured within a cutting element pocket to be formed by subsequently machining the at least one inverted cutting element pocket. Hardfacing material may be applied to portions of the tool body. The actual cutting element pocket is formed by removing material of the tool body within the at least one inverted cutting element pocket subsequent to applying the hardfacing material to portions of the tool body. A cutting element is affixed within the actual cutting element pocket.

14 Claims, 5 Drawing Sheets

(51) Int. Cl.
*B23K 26/34* (2014.01)
*B23K 101/20* (2006.01)
*B23K 103/04* (2006.01)
*B23K 103/18* (2006.01)

(56) References Cited

U.S. PATENT DOCUMENTS

| | | |
|---|---|---|
| 6,772,849 B2 | 8/2004 | Oldham et al. |
| 2010/0101868 A1 | 4/2010 | Izaguirre et al. |
| 2010/0193254 A1 | 8/2010 | Lind et al. |
| 2010/0263937 A1 | 10/2010 | Overstreet et al. |
| 2010/0282026 A1 | 11/2010 | Luce et al. |
| 2013/0206483 A1 | 8/2013 | Johnson et al. |

OTHER PUBLICATIONS

International Written Opinion for International Application No. PCT/US2015/064603, dated Mar. 10, 2016, 8 pages.

EARTH-BORING TOOLS WITH PRECISE CUTTER POCKET LOCATION AND ORIENTATION AND RELATED METHODS

TECHNICAL FIELD

Embodiments of the present disclosure relate to earth-boring tools with cutting element pockets formed therein, and methods of forming cutter pockets in earth-boring tools.

BACKGROUND

Earth-boring tools are used to form boreholes (e.g., well-bores) in subterranean formations. Such earth-boring tools may include drill bits, reamers, mills, etc. A conventional fixed-cutter earth-boring rotary drill bit includes a bit body having generally radially projecting and longitudinally extending blades. A plurality of cutting elements may be fixed (e.g., brazed) within pockets formed in the blades. During drilling operations, the drill bit is positioned at the bottom of a well borehole and rotated, and the cutting elements engage and degrade the formation material by mechanisms such as shearing, abrading, etc.

The bit body may comprise materials such as metal alloys (e.g., steel) or particle-matrix composite materials, e.g., cemented tungsten carbide particles dispersed in a metal alloy matrix (e.g., bronze). The bit body may be manufactured by machining, e.g., by milling a steel blank to shape, or casting, e.g., by forming a mold with a negative shape of the desired bit body and filling the mold with molten alloy. Conventionally, the pockets into which the cutting elements are to be affixed are formed in the bit body when the bit body is initially machined or cast to shape. Cutting elements are then affixed within the cutting element pockets using, for example, a brazing process. Other downhole tools also include such cutting elements affixed within cutting element pockets.

Frequently, high-wear areas of steel and other bodies of drill bits and other downhole tools are coated with an abrasion-resistant hardfacing material to reduce wear. Such hardfacing material may comprise particles of cemented tungsten carbide dispersed within a metal matrix material. Hardfacing materials may be applied by welding processes, e.g., plasma-transferred arc welding, oxygen-acetylene welding, gas metal arc welding, or other deposition processes that cause heating of the tool body. The tool body may also undergo thermal processing steps such as heat treatment prior to use of the earth-boring tool in a downhole environment.

BRIEF SUMMARY

In one aspect of the disclosure, a method of forming an earth-boring tool includes forming a tool body including at least one inverted cutting element pocket, at least a portion of the at least one inverted cutting element pocket having a profile substantially matching a profile of an actual cutting element to be secured within a cutting element pocket to be formed by subsequently machining the at least one inverted cutting element pocket. Hardfacing material is applied to portions of the tool body. The actual cutting element pocket is formed by removing material of the tool body within the at least one inverted cutting element pocket subsequent to applying the hardfacing material to portions of the tool body, and a cutting element is affixed within the actual cutting element pocket.

In another aspect of the disclosure, a method of forming an earth-boring tool includes forming a tool body including at least one inverted cutting element pocket, at least a portion of the inverted cutting element pocket having a profile substantially matching a profile of an actual cutting element to be secured within a cutting element pocket to be formed by subsequently machining the at least one inverted cutting element pocket. A machining process is used to remove at least a portion of the at least one inverted cutting element pocket to form the actual cutting element pocket subsequent to application of heat to the tool body during one or more of heat treatment and application of hardfacing material. A cutting element is affixed within the actual cutting element pocket.

BRIEF DESCRIPTION OF THE SEVERAL VIEWS OF THE DRAWINGS

While the specification concludes with claims particularly pointing out and distinctly claiming what are regarded as embodiments of the disclosure, various features and advantages of disclosed embodiments may be more readily ascertained from the following description when read with reference to the accompanying drawings, in which:

DETAILED DESCRIPTION

Figure 1:
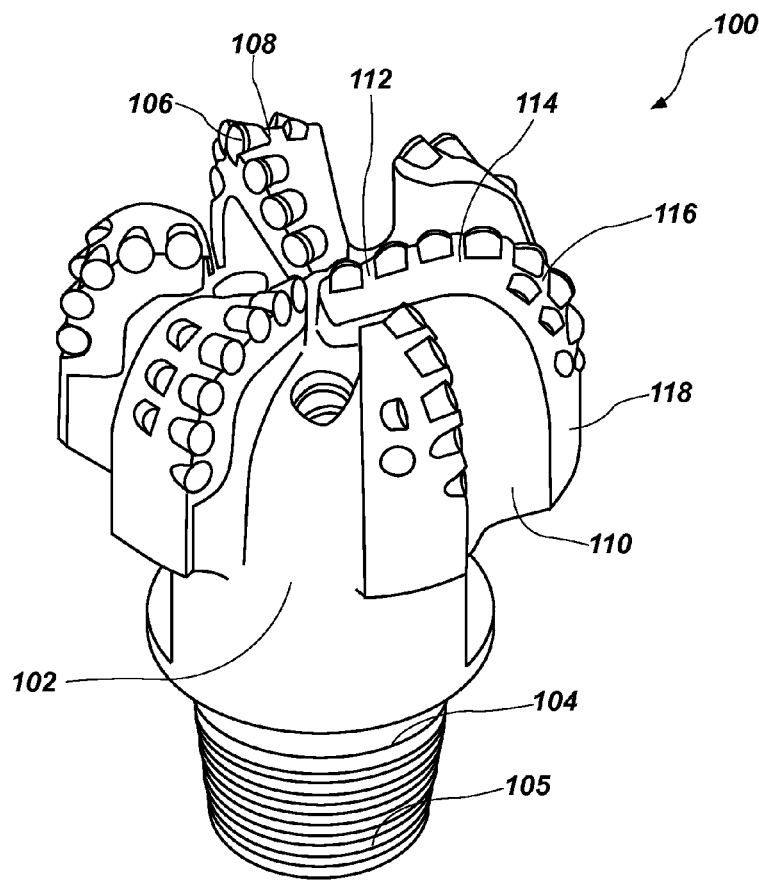
FIG. 1 is a perspective view of an earth-boring tool according to an embodiment of the disclosure.

The illustrations presented herein are not actual views of any particular material or earth-boring tool, but are merely idealized representations employed to describe embodiments of the present disclosure. Additionally, elements common between figures may retain the same numerical designation.

During conventional formation of bit bodies and tool components carrying cutting elements, heat-induced deformation occurring during thermal processing (e.g., heat treatment) and/or application of hardfacing materials may cause permanent distortion of the body, resulting in inaccuracy of the position and/or orientation of the cutting element pockets relative to design specifications. The inventors have unexpectedly discovered that in use, even small deviations (i.e., on the order of about 0.001" (0.0254 mm)) in the intended position of cutting elements from design specifications may have a significant effect on the rate-of-penetration (ROP) beyond which a rotary drill bit is judged to run stably (i.e., the point of "stable crossing"). In other words, manufacturing tolerances inherent in conventional manufacturing processes may compromise the range of rates of penetration at which drill bits and other downhole tools may drill in a stable drilling mode, and may compromise the performance of the downhole tools. The stable crossing may be more sensitive to variations in position and orientation of cutting elements in some cutting positions or regions of the tool body than cutting elements in other cutting positions or regions of the tool body. For example, the stable crossing of a rotary earth-boring drill bit may be particularly sensitive to the position and orientation of cutters located proximate the nose portion of the drill bit. In addition to compromised performance and durability (i.e., intra-bit effect), variations in position and orientation of the cutting elements of an earth-boring bit or tool from the design specifications may cause inconsistent and unpredictable performance between different bits with the same design and specifications (i.e., inter-bit effect).

As used herein, the terms "bit" and "tool" may be used interchangeably for the sake of convenience, and the terms "tool" and "downhole tool" encompass drill bits. Similarly, the term "tool body" encompasses both components of downhole tools configured to carry cutting elements as well as bodies of drill bits.

Described herein are methods and materials for manufacturing earth-boring bits and tools that include cutting elements such as polycrystalline diamond compact (PDC) cutting elements that exhibit much tighter manufacturing tolerances, so as to ensure that the actual drill bit or other downhole tool embodies the intended design of the drill bit or other downhole tool with respect to the position and orientation of the cutting elements mounted thereto. Stated another way, the disclosure includes methods and materials that enable manufacturing of earth-boring tools with cutting element pockets having accurate position and orientation relative to design specifications. Thus, earth-boring tools as described herein may exhibit reduced (e.g., minimized) variation between the specified position and orientation of the cutting element pockets in an earth-boring tool design and the actual position and orientation of the cutting element pockets and cutting elements in an actual, physical earth-boring tool manufactured according to the design.

FIG. 1 is a perspective view of an embodiment of an earth-boring tool 100 in the form of a rotary fixed-cutter earth-boring drill bit, although any other type of downhole tool including cutting elements mounted in cutting element pockets on a body of the tool may also embody teachings of the present disclosure. For example, a device for enlarging boreholes (e.g., a reamer), or any other tool in which cutting elements are affixed in pockets in a tool body, may be the subject of manufacturing methods and materials as described.

The earth-boring tool 100 may include a tool body 102 with a shank 104 having a connection portion 105 (e.g., an American Petroleum Institute (API) threaded connection) configured to attach the earth-boring tool 100 to a drill string (not shown).

The earth-boring tool 100 may include cutting elements 106 secured within cutting element pockets 108. As a non-limiting example, the cutting elements 106 may comprise polycrystalline diamond compact (PDC) cutting elements. The cutting element pockets 108 may be formed in blades 110 of the earth-boring tool 100. Each blade 110 may extend radially outward from a cone region 112 at a radially innermost position of the blade 110. Each blade 110 may include a nose region 114 adjacent to and radially outward from the cone region 112. Each blade 110 may include a shoulder region 116 adjacent to and radially outward from the nose region 114, and a gage portion 118 adjacent to the shoulder region 116.

Figure 2:
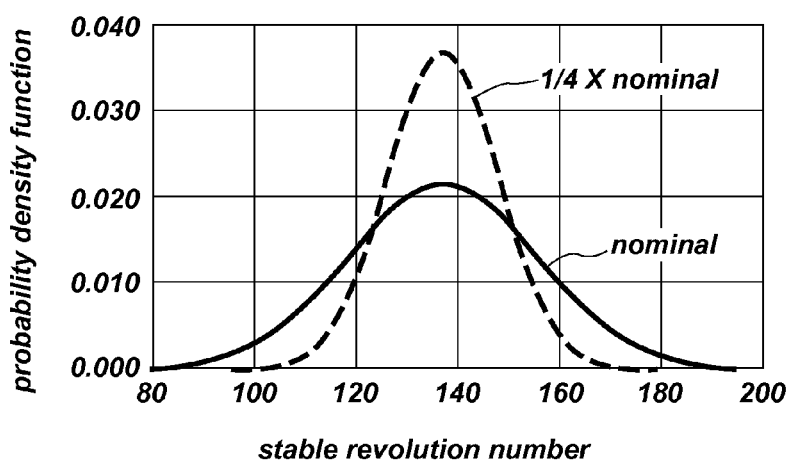
FIG. 2 is a plot of a Monte Carlo simulation showing that variance of "stable crossing" ROP rises with cutter position tolerance.

FIG. 2 illustrates a plot of a Monte Carlo simulation showing that variance of the stable crossing ROP rises with cutter position tolerance. As shown in the plot, a reduction of cutting element position and orientation tolerances to one-fourth (¼) of a nominal value may significantly reduce variability of the stable crossing ROP. An earth-boring tool 100 may be formed using materials and manufacturing methods to reduce cutter position tolerance, and thus reduce variation of the stable crossing ROP, in the following manner. One or more cutting elements 106 of the earth-boring tool 100 may be designated as a "critical" cutting element. A critical cutting element may be a cutting element 106 for which deviations in position and orientation from design specifications have a relatively greater effect on bit dynamic stability and/or cutting performance than similar deviations of other cutting elements 106 that are not designated critical. Identification of critical cutting elements 106 may be accomplished using statistical and empirical methods, computerized methods, (e.g., dynamic simulation software), or other methods. In some embodiments, all cutting elements 106 in a particular region of the blade 110 may be designated as critical. For example, the inventors have determined that reduced tolerances of cutting elements near the nose of the drill bit may have the most significant effect on stable crossing ROP. Alternatively, all cutting elements 106 of the earth-boring tool 100 may be designated as critical.

Figure 3:
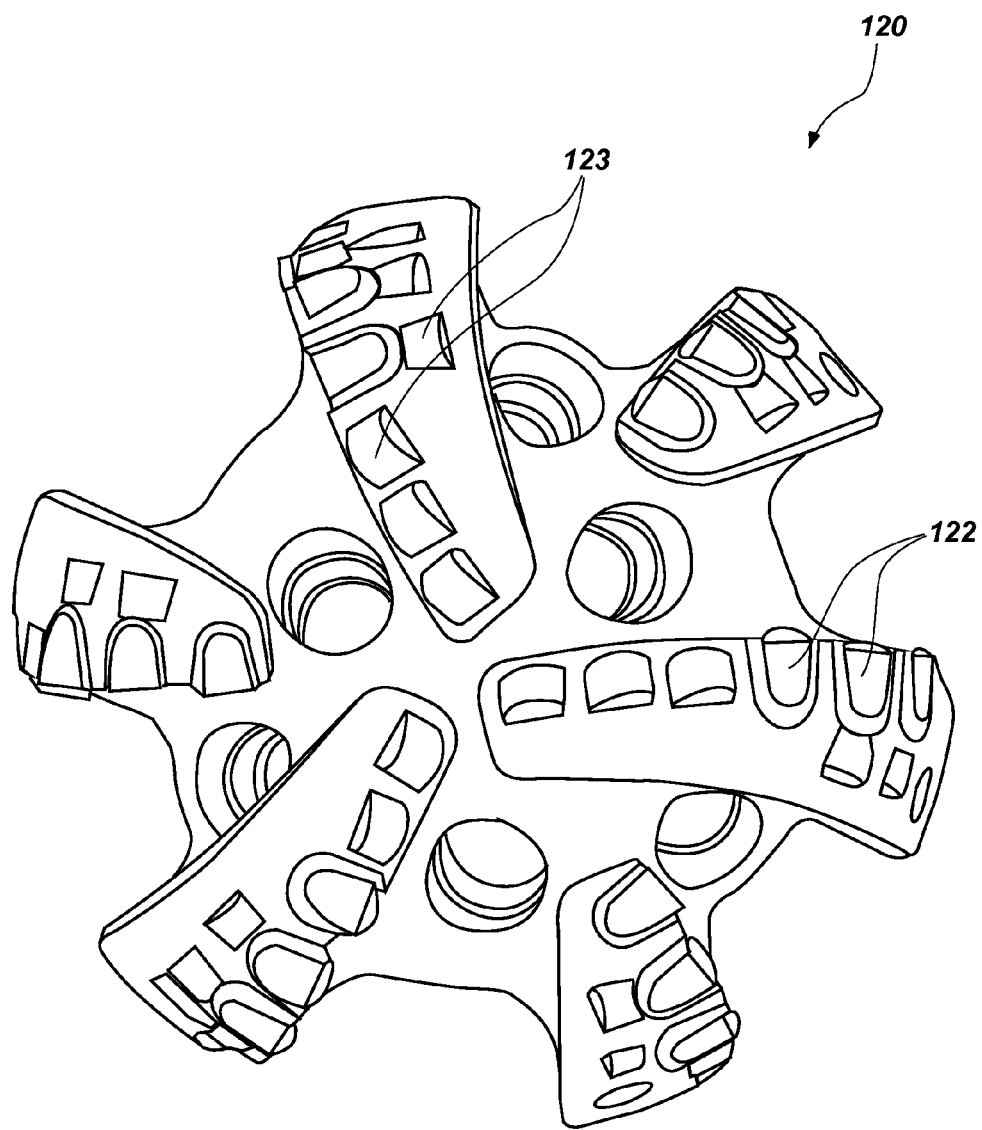
FIG. 3 is a top view of an intermediate tool body according to an embodiment of the disclosure.

Referring now to FIG. 3, an intermediate tool body 120 corresponding to the bit body 102 of the earth-boring tool 100 (FIG. 1) in an unfinished (i.e., partially manufactured) state may be formed from a metal alloy (e.g., steel) or a composite material including, for example, particles of tungsten carbide dispersed in a metal alloy (e.g., bronze, steel, etc.). In one embodiment, the intermediate tool body 120 may be formed by machining a steel blank with the desired geometry and features. Alternatively, the intermediate tool body 120 may be formed by casting, e.g., by introducing molten metal alloy into a mold with the reverse shape of the intermediate tool body 120. In embodiments in which the intermediate tool body 120 comprises a particle-matrix composite material, particles of wear-resistant material (e.g., tungsten carbide) may be placed within a mold and infiltrated with a molten metal alloy (e.g., bronze).

In a conventional earth-boring tool manufacturing process for a steel body tool, cutting element pockets may be machined into the bit body when a steel blank is machined with the bit geometry and features. In a conventional earth-boring tool manufacturing process for a tool body comprising a particle-matrix composite material (e.g., cobalt-cemented tungsten carbide), cutting element pockets may be formed in the bit body during the casting process by inserting removable displacements into the mold prior to casting the bit body within the mold and around the displacements.

After forming the bit body, heat cycles applied to the bit body during thermal processing (e.g., heat treatment) or hardfacing application may result in relatively minor distortion and inaccuracy of the position and orientation of cutting element pockets. In embodiments described herein, one or more cutting element pockets 108 (FIG. 1) of the earth-boring tool 100 may be partially or completely unformed in the intermediate tool body 120 after machining the blank to shape (in embodiments with a machined steel bit) or after casting (in cast embodiments, e.g., cast alloys or particle-matrix composite materials). For example, one or more cutting element pockets 108 (FIG. 1) corresponding to cutting elements 106 (FIG. 1) identified as "critical" cutting elements may be partially formed or unformed in the intermediate tool body 120. The cutting element pockets corresponding to critical cutting elements may be machined after application of hardfacing and other thermal processing acts. A manufacturing sequence as described herein may improve the accuracy of the position and orientation of the cutting element pockets by eliminating heat-induced distortion as a source of variation.

With continued reference to FIG. 3, in accordance with embodiments of the present disclosure, when the tool body 120 is formed, "inverted" cutting element pockets 122 are formed at the locations corresponding to "critical" cutting element pockets 108 in the particular bit design. The inverted cutting element pockets 122 may have a shape and location at least substantially similar to the shape and location of the corresponding cutting element pockets 108 to be formed in the finished earth-boring tool 100. Thus, the inverted cutting element pockets 122 may comprise protrusions on the face of the intermediate tool body 120 that have an appearance similar to cutting elements 106 (FIG. 1) mounted to the tool body. The inverted cutting element pockets 122 in the intermediate tool body 120 may comprise integral portions of the tool body that will be subsequently removed, after one or more subsequent manufacturing processes that involve the application of heat to the tool body, to form the cutting element pockets 108 in the tool body. Thus, in embodiments in which the tool body comprises steel or is manufactured by machining a billet, the inverted cutting element pockets 122 may be formed by machining of the billet at the time the intermediate tool body 120 is formed by machining. In embodiments in which the tool body comprises a particle-matrix composite material or is manufactured by casting in a mold, the inverted cutting element pockets 122 may be formed on, or as an integral part of, the intermediate tool body 120 at the time the intermediate tool body 120 is cast within a mold.

In some embodiments, the inverted cutting element pockets 122 may be formed to have an outer diameter at least substantially identical to an outer diameter of the cutting elements 106 intended to be affixed within the cutting element pockets 108 to be formed at the locations of the inverted cutting element pockets 122. In other embodiments, the inverted cutting element pockets 122 may be formed to have an outer diameter slightly smaller than an outer diameter of the cutting elements 106 intended to be affixed within the cutting element pockets 108 to be formed at the locations of the inverted cutting element pockets 122. In yet other embodiments, the cutting element pockets may be machined or molded to net shape or near net shape, and a machineable displacement (not shown) may be inserted within the cutting element pocket. The machineable displacements may comprise an easily machineable metal alloy (e.g., mild steel) and may have, for example, a solid or hollow cylindrical shape.

Cutting element pockets 123 for cutting elements not designated as critical cutting elements (i.e., "non-critical" cutting elements) may be fully formed in the intermediate tool body 120 using conventional processes. For example, cutting element pockets 123 may be formed by the machining or casting operation used to form the intermediate tool body 120. Cutting element pockets 123 may correspond to cutting elements in backup positions, i.e., cutting elements that rotationally trail other cutting elements, cutting elements positioned on the gage portion 118 (FIG. 1) of the blade 110 of the earth-boring tool 100, cutting elements positioned on the cone portion 112 of the blade 110 of the earth-boring tool 100, or cutting elements positioned on other portions of the blade 110.

As described below in connection with FIGS. 4 and 5, one or more hardfacing materials may be applied to the intermediate tool body 120 in areas where additional wear resistance is desired. For example, additional wear resistance may be desired adjacent the cutting element pockets 108 (FIG. 1), and on areas of the blade 110 rotationally leading or rotationally trailing the cutting elements 106. In some embodiments, a first hardfacing material 126 (FIG. 4) may be applied to portions of the intermediate tool body 120 directly adjacent the inverted cutting element pockets 122. In other words, the first hardfacing material 126 may be applied to portions of the intermediate tool body 120 directly adjacent the desired locations of cutting element pockets 108 (FIG. 1) of the completed earth-boring tool 100. A second hardfacing material 128 (FIG. 5) may be applied to portions of the intermediate tool body 120 not directly adjacent the inverted cutting element pockets 122 (and thus not directly adjacent the desired locations of cutting element pockets 108).

The first hardfacing material 126 may be relatively easier to machine than the second hardfacing material 128. Ease of machining, i.e., "machinability," may be defined variously by parameters such as machining tool life, machining tool forces and machining tool power consumption, AISI machinability rating, and other parameters. In some embodiments, the first hardfacing material 126 may exhibit an AISI machinability rating at least about 10% greater than the AISI machinability rating of the second hardfacing material 128. The first hardfacing material 126 may be chosen to exhibit a specific combination of machinability and wear-resistance. The first hardfacing material 126 may include finer, more uniformly distributed particles of a hard material, such as tungsten carbide, compared to the second hardfacing material 128. Thus, machining of the first hardfacing material 126 may be less likely to result in impact failure of the machining tool compared to machining of the second hardfacing material 128. Finish machining of the first hardfacing material 126, as described further below, may be performed with relatively high surface speeds and relatively low depths-of-cut compared to conventional machining operations. A machining tool used to machine the first hardfacing material 126 may include a surface finish (e.g., aluminum nitride) configured to reduce thermal wear resulting from high surface speeds.

Figure 4:
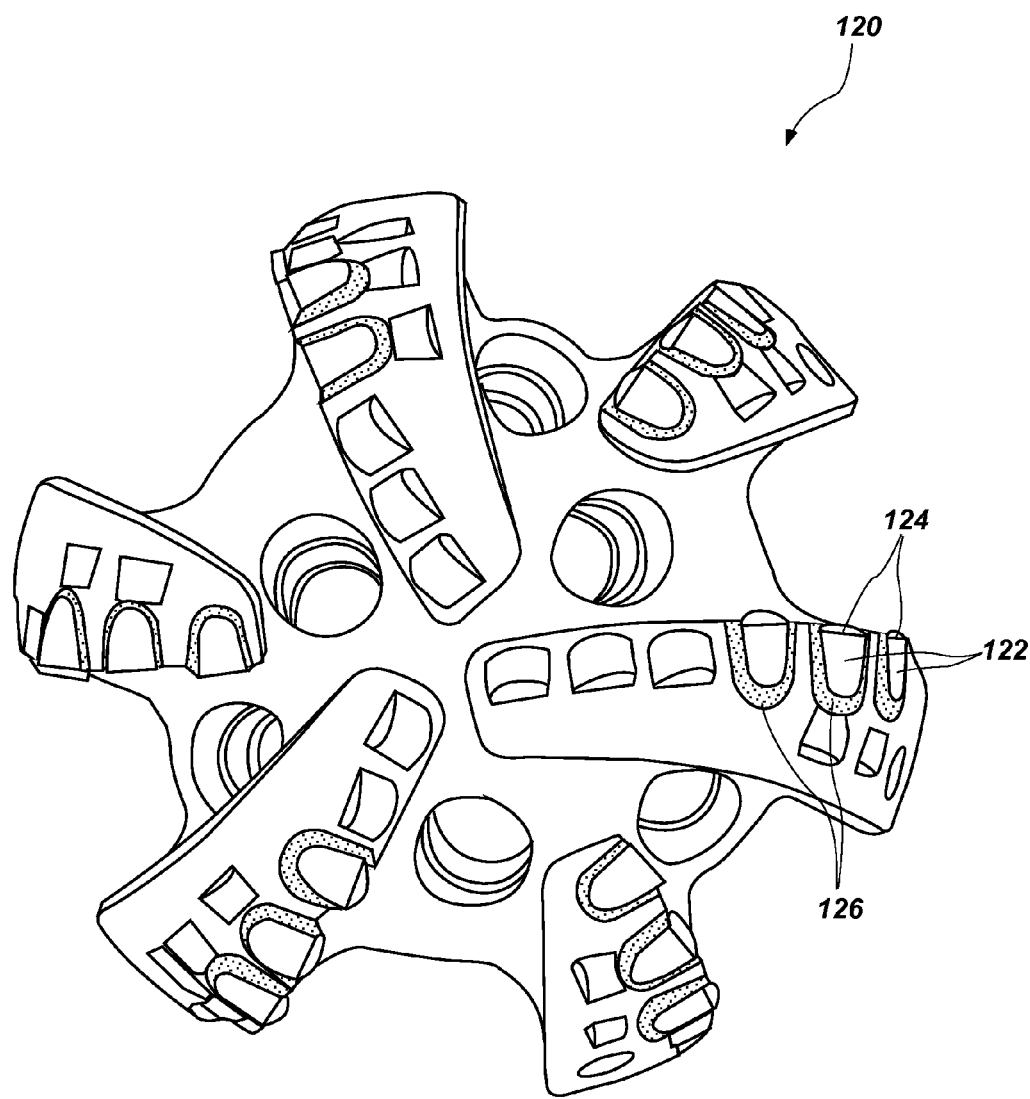
FIG. 4 is a top view of an intermediate tool body including a first hardfacing material according to an embodiment of the disclosure.

Referring now to FIG. 4, the first hardfacing material 126 may be applied to selected areas of the intermediate tool body 120 that may be contacted by a machining tool to be used to subsequently form the cutting element pockets 108 at the locations of the inverted cutting element pockets 122. For example, the first hardfacing material 126 may be applied to portions of the intermediate tool body 120 adjacent the inverted cutting element pockets 122. In some embodiments, portions of the first hardfacing material 126 may overlie portions of the inverted cutting element pockets 122. In some embodiments, regions of the intermediate tool body 120 where it is not desired to apply the first hardfacing material 126 may be masked with a compound or material that inhibits wetting of the intermediate tool body 120 with the first hardfacing material 126. For example, a wetting inhibitor may be applied at least to faces 124 of the inverted cutting element pockets 122 of the intermediate tool body 120 to prevent wetting of the faces 124 with the first hardfacing material 126. One example of a suitable wetting inhibitor is NICROBRAZ® STOP-OFF™, available from Wall Colmonoy Corporation, 101 W. Girard, Madison Heights, Mich. 48071, USA.

The first hardfacing material 126 may comprise materials selected to enable machining of the first hardfacing material 126. For example, in some embodiments, the first hardfacing material 126 may comprise a nickel-boron-silicon (Ni—B—

Si) matrix material, in which macro-crystalline particles of tungsten carbide (WC) are dispersed. One example of a commercially available hardfacing material that may be used as the first hardfacing material 126 is NITUNG™ 60, a hardfacing material including 60 percent tungsten carbide particles by weight in a proprietary alloy matrix, available from Carpenter Powder Products, 600 Mayer Street, Bridgeville, Pa. 15017 USA. In other embodiments, the first hardfacing material 126 may comprise homogeneous material, e.g., a substantially continuous metal alloy with a relatively high hardness and without a dispersed particulate phase. For example, some cobalt-based alloys may be suitable for use as the first hardfacing material 126. The particular material and composition used for the first hardfacing material 126 may be chosen based upon results of wear testing at contact pressures determined for the specific tool and application.

The first hardfacing material 126 may be applied by oxy-acetylene welding (OAW), plasma-transferred arc welding (PTAW), gas tungsten arc welding (GTAW), high-velocity oxygen fuel thermal spraying (HVOF), high-velocity air fuel thermal spraying (HVAF), laser cladding, etc. Optionally, the HVOF and HVAF processes may include a fusion step. The first hardfacing material 126 may be applied manually, semi-automatically, or automatically. The first hardfacing material 126 may exhibit minimal dilution at the interface between the intermediate tool body 120 and the first hardfacing material 126. Dilution may be defined as the weight percentage of substrate metal (i.e., material of the intermediate tool body 120) which has diffused into the hardfacing material 126. For example, the first hardfacing material 126 may exhibit less than ten (10) percent dilution, less than five (5) percent dilution, or less at the interface between the intermediate tool body 120 and the first hardfacing material 126.

Figure 5:
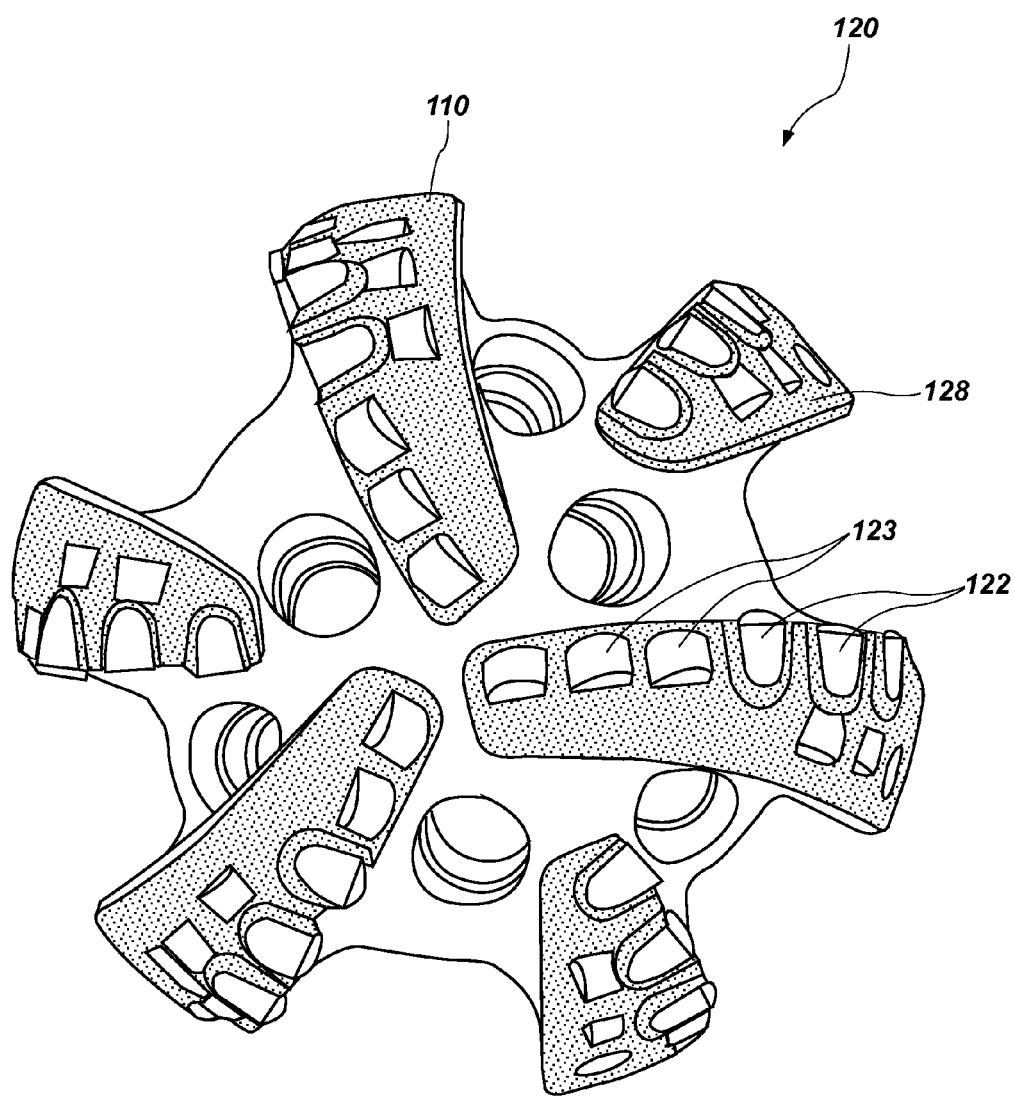
FIG. 5 is a top view of an intermediate tool body including a second hardfacing material according to an embodiment of the disclosure.

Referring now to FIG. 5, a second hardfacing material 128 may be applied to other selected areas of the intermediate tool body 120. The other selected areas may comprise, for example, high-wear areas of the earth-boring tool 100 (FIG. 1) not directly adjacent the inverted cutting element pockets 122. In some embodiments, the second hardfacing material 128 may be applied over portions of the blade 110 rotationally leading and/or rotationally trailing the inverted cutting element pockets 122. Accordingly, the first hardfacing material 126 may be located between the inverted cutting element pockets 122 and the second hardfacing material 128. The second hardfacing material 128 may comprise a conventional hardfacing material, such as particles of cemented tungsten carbide dispersed in a metal matrix of, e.g., an iron, cobalt, or nickel alloy, and the composition thereof may be selected for its wear-resistance and/or durability, rather than its machinability. In other words, the second hardfacing material 128 may be chosen without regard for machinability, as the second hardfacing material 128 may be applied to areas of the intermediate bit body 120 that do not require subsequent finish machining. In some embodiments, a wetting inhibitor as described above may be applied to portions of the intermediate bit body 120 over which it is not desired to apply the second hardfacing material 128, e.g., portions of first hardfacing material 126, pockets 123 previously formed for non-critical cutting elements, etc. The second hardfacing material 128 may be applied using any of the methods described above in connection with the first hardfacing material 126, or other suitable methods.

In some embodiments, the second hardfacing material 128 may be applied to areas of the intermediate tool body 120 that are larger than the areas to which the first hardfacing material 126 is applied. For example, while the first hardfacing material 126 may be applied only to locations adjacent the inverted cutting element pockets 122, the second hardfacing material 128 may be applied over larger areas of the blades 110, as shown in FIG. 5. The second hardfacing material 128 may be applied over (i.e., may overlap) at least a portion of the first hardfacing material 126. In other embodiments, the second hardfacing material 128 may be applied prior to application of the first hardfacing material 126. In these embodiments, a portion of the first hardfacing material 126 may be applied over (i.e., overlap) a portion of the second hardfacing material 128.

Methods used to apply the first hardfacing material 126 and the second hardfacing material 128 may result in application of heat to the intermediate tool body 120. Furthermore, in some embodiments, the intermediate tool body 120 may undergo thermal processing, such as heat treatment, quenching, aging, etc., to refine the microstructure of the material of the intermediate tool body 120. As previously discussed, such thermal processing may result in minor distortions (e.g., warping) of the intermediate tool body 120. In other words, heat-induced deformation may result in deviations of the actual shape of the intermediate tool body 120 from design specifications. Accordingly, following thermal processing and application of the hardfacing materials 126 and 128, the location and orientation of the inverted cutting element pockets 122 and the cutting element pockets 123 for non-critical cutting elements may differ slightly from design specifications due to heat-induced deformation similar to that which may occur in connection with thermal processing. Accordingly, as described below, finish machining to create cutting element pockets 108 (FIG. 1) in locations of critical cutting elements may be performed after such thermal processing acts and after application of the first and second hardfacing materials 126 and 128.

At least a portion of the inverted cutting element pockets 122 may be removed to form a cutting element pocket 108 (FIG. 1) in each critical cutter location substantially exhibiting a position, size, shape and orientation corresponding to a predetermined, design position, size, shape and orientation for that respective cutting element pocket. For example, the intermediate tool body 120 may be machined to remove at least a portion of the inverted cutting element pockets 122. Machining the cutting element pockets 108 may include machining at least a portion of the first hardfacing material 126 adjacent the protrusion 122, depending on the precise size and shape of the inverted cutting element pockets 122 and the degree of any distortion thereof caused by thermal processing. Accordingly, the tools used to machine the cutting element pockets 108 may be configured to enable machining of the first hardfacing material 126.

For example, the cutting element pockets 108 may be machined using a tool comprising hard materials and/or a hard surface coating. In one embodiment, the cutting element pockets are machined using an end mill with an aluminum nitride coating. Such milling tools may be available from KENNAMETAL® Inc., 1600 Technology Way, Latrobe, Pa. 15650 USA.

The machining process and parameters may be tailored to facilitate machining of the first hardfacing material 126, if needed. For example, the speed and feed rate of the end mill may be chosen based on the cutting characteristics of the tool and the particular composition of the first hardfacing material 126.

Figure 6:
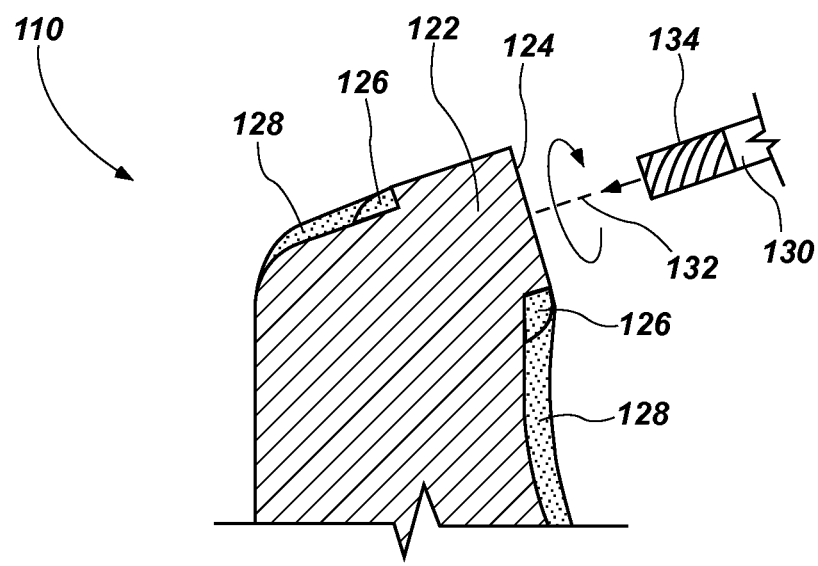
FIG. 6 is a side cross-sectional view of a portion of a blade of an intermediate tool body according to an embodiment of the disclosure.

In some embodiments, machining may commence in a location free from the first hardfacing material 126 and the second hardfacing material 128. For example, referring now to FIG. 6, a portion of a blade 110 of an intermediate bit body 120 (FIG. 5) is shown. A machining operation may be started by plunging an end mill 130 into the face 124 of the inverted cutting element pocket 122 along a longitudinal axis 132 corresponding to an axis of the actual cutting element pocket 108 (FIG. 1) to be formed corresponding to the selected, predetermined orientation of the actual cutting element pocket. The end mill 130 may be moved radially (e.g., orbited) with respect to a rotational axis of the end mill and, depending on the precise size and shape of the inverted cutting element pockets 122, a lateral portion 134 of the end mill 130 may engage the first hardfacing material 126. If the lateral portion 134 of the end mill 130 engages the first hardfacing material 126, the end mill 130 may remain engaged with all phases of the first hardfacing material 126 (e.g., the end mill 130 may remain engaged with both the metal alloy matrix phase and the discontinuous tungsten carbide particle phase) until the end mill 130 is no longer engaging any portion of the first hardfacing material 126. This may prevent abrupt changes in work rate that may occur if the end mill 130 were repeatedly brought into contact with and removed from contact with the different phases of the first hardfacing material 126. In some embodiments, formation of the cutting element pockets 108 may be performed using polycrystalline diamond-enhanced tools, ultrasonic methods, electrical discharge machining (EDM), thermally-assisted machining or other methods. Following finish machining of the cutting element pockets 108, cutting elements 106 may be inserted and affixed within the cutting element pockets 108. For example, cutting elements 106 may be brazed within cutting element pockets 108.

An earth-boring tool 100 (FIG. 1) as described may exhibit smaller manufacturing tolerances than a conventionally manufactured earth-boring tool with respect to cutting element pocket location and orientation. For example, in some conventionally manufactured earth-boring tools, typical ranges for cutting element position and orientation deviations from design specifications (i.e., manufacturing tolerances) may be up to about ±0.034 inch (about 0.86 millimeter) and about ±2.7 degrees, respectively. In earth-boring tools manufactured as described herein, typical ranges for cutting element position and orientation deviations from design specifications may be about an order of magnitude less than the typical ranges for conventionally manufactured tools. For example, an earth-boring tool manufactured as described may exhibit deviations in cutting element position and orientation from design specifications of about ±0.005 inch (0.13 mm) and about ±0.25 degrees, respectively. By performing finish machining of cutting element pockets 108 after thermal processing and/or hardfacing procedures, the effect of distortion from thermal processing on the position and orientation of cutting element pockets 108 is minimized (e.g., eliminated). Accordingly, an earth-boring tool 100 manufactured as described herein may exhibit a larger range of stable rates of penetration, more predictable ranges of stable rates of penetration, superior durability, more consistent operating characteristics between different bits of the same design, and improved performance compared to conventionally manufactured earth-boring tools.

Additional non-limiting example embodiments of the disclosure are set forth below.

Embodiment 1: A method of forming an earth-boring tool, the method comprising: forming a tool body including at least one inverted cutting element pocket, at least a portion of the at least one inverted cutting element pocket having a profile substantially matching a profile of an actual cutting element to be secured within a cutting element pocket to be formed by subsequently machining the at least one inverted cutting element pocket; applying hardfacing material to portions of the tool body; forming the actual cutting element pocket by removing material of the tool body within the at least one inverted cutting element pocket subsequent to applying the hardfacing material to portions of the tool body; and affixing a cutting element within the actual cutting element pocket.

Embodiment 2: The method of Embodiment 1, further comprising forming the inverted cutting element pocket to comprise an integral portion of the tool body.

Embodiment 3: The method of Embodiment 1, wherein forming a tool body including at least one inverted cutting element pocket comprises forming a tool body including at least one inverted cutting element pocket comprising a displacement inserted within a recess in the tool body.

Embodiment 4: The method of any one of Embodiments 1 through 3, wherein applying hardfacing material to portions of the tool body comprises applying a first hardfacing material, selected to exhibit a specific combination of machinability and wear-resistance, to portions of the tool body adjacent the at least one inverted cutting element pocket, and applying a second hardfacing material having a different composition than the first hardfacing material to at least a portion of the tool body separated from the at least one inverted cutting element pocket by at least a portion of the first hardfacing material.

Embodiment 5: The method of Embodiment 4, wherein applying a first hardfacing material comprises applying a first hardfacing material including hard particles dispersed within a matrix metal comprising a nickel-based alloy.

Embodiment 6: The method of Embodiment 5, wherein applying a first hardfacing material including hard particles dispersed within a matrix metal comprising a nickel-based alloy comprises applying a first hardfacing material including a matrix metal comprising at least nickel, boron, and silicon.

Embodiment 7: The method of any one of Embodiments 4 through 6, wherein applying a second hardfacing material having a different composition than the first hardfacing material comprises applying a second hardfacing material comprising hard particles dispersed within an iron-based metal alloy matrix.

Embodiment 8: The method of any one of Embodiments 4 through 7, wherein applying a second hardfacing material having a different composition than the first hardfacing material further comprises applying a second hardfacing material having a different AISI machinability rating than the first hardfacing composition, and wherein the AISI machinability rating of the first hardfacing composition is at least about 10% greater than the AISI machinability rating of the second hardfacing composition.

Embodiment 9: The method of any one of Embodiments 1 through 8, further comprising applying a wetting inhibitor to at least a portion of the at least one inverted cutting element pocket before applying a hardfacing material to portions of the tool body.

Embodiment 10: The method of Embodiment 9, wherein applying a wetting inhibitor to at least a portion of the at least one inverted cutting element pocket comprises applying a wetting inhibitor to a face of the at least one inverted cutting element pocket.

Embodiment 11: The method of any one of Embodiments 1 through 10, wherein forming the actual cutting element pocket by removing material of the tool body within the at least one inverted cutting element pocket comprises machining at least a portion of the at least one inverted cutting element pocket from the tool body using a machining tool.

Embodiment 12: The method of any one of Embodiments 1 through 11, wherein forming a tool body including at least one protruding structure comprises forming a rotary drag bit body.

Embodiment 13: The method of any one of Embodiments 1 through 12, wherein no heat treatment of the tool body occurs subsequent to forming the actual cutting element pocket by removing material of the tool body.

Embodiment 14: The method of any one of Embodiments 1 through 13, wherein no hardfacing is applied to the tool body subsequent to forming the actual cutting element pocket by removing material of the tool body.

Embodiment 15: A method of forming an earth-boring tool, the method comprising: forming a tool body including at least one inverted cutting element pocket, at least a portion of the at least one inverted cutting element pocket having a profile substantially matching a profile of an actual cutting element to be secured within a cutting element pocket to be formed by subsequently machining the at least one inverted cutting element pocket; using a machining process to remove at least a portion of the at least one inverted cutting element pocket to form the actual cutting element pocket subsequent to application of heat to the tool body during one or more of heat treatment and application of hardfacing material; and affixing a cutting element within the actual cutting element pocket.

Embodiment 16: The method of Embodiment 15, wherein forming a tool body including at least one inverted cutting element pocket comprises machining a tool body from a steel blank.

Embodiment 17: The method of Embodiment 15, wherein forming a tool body including at least one inverted cutting element pocket comprises casting a tool body in a mold.

Embodiment 18: The method of any one of Embodiments 15 through 17, further comprising forming the inverted cutting element pocket to comprise an integral portion of the tool body.

Embodiment 19: The method of any one of Embodiments 15 through 18, further comprising applying a first hardfacing material to the tool body adjacent the at least one inverted cutting element pocket, and applying a second hardfacing material having a composition different from the composition of the first hardfacing material to at least a portion of the tool body separated from the at least one inverted cutting element pocket by the first hardfacing material.

Embodiment 20: The method of any one of Embodiments 15 through 19, further comprising heat-treating the tool body by heating the tool body to an elevated temperature before using a machining process to remove at least a portion of the at least one inverted cutting element pocket.

Although the foregoing description and accompanying drawings contain many specifics, these are not to be construed as limiting the scope of the disclosure, but merely as describing certain embodiments. Similarly, other embodiments may be devised, which do not depart from the spirit or scope of the disclosure. For example, features described herein with reference to one embodiment also may be provided in others of the embodiments described herein. The scope of the invention is, therefore, indicated and limited only by the appended claims and their legal equivalents. All additions, deletions, and modifications to the disclosed embodiments, which fall within the meaning and scope of the claims, are encompassed by the present disclosure.

What is claimed is:

1. A method of forming an earth-boring tool, the method comprising:
   forming a tool body including a plurality of inverted cutting element pockets formed within a blade of the tool body, at least a portion of each of the plurality of inverted cutting element pockets having a profile substantially matching a profile of a respective actual cutting element to be secured within a cutting element pocket to be formed by subsequently machining the inverted cutting element pocket of the plurality of inverted cutting element pockets;
   applying a first hardfacing material to portions of the blade of the tool body and at least substantially surrounding an outer peripheral edge of each inverted cutting element pocket of the plurality of inverted cutting element pockets with the first hardfacing material;
   applying a second different hardfacing material to portions of the blade of the tool body immediately adjacent to the first hardfacing material, the second different hardfacing material extending between adjacent inverted cutting element pockets of the plurality of inverted cutting element pockets;
   forming a plurality of actual cutting element pockets by removing material of the tool body within each of the plurality of inverted cutting element pockets subsequent to applying the hardfacing material to portions of the tool body; and
   affixing cutting elements within the plurality of actual cutting element pockets.

2. The method of claim 1, further comprising forming the plurality of inverted cutting element pockets to comprise an integral portion of the tool body.

3. The method of claim 1, wherein forming a tool body including a plurality of inverted cutting element pockets comprises forming a tool body including a plurality of inverted cutting element pockets each comprising a displacement inserted within a recess in the tool body.

4. The method of claim 1, wherein applying the first and second hardfacing materials to portions of the blade of the tool body comprises applying the first hardfacing material, selected to exhibit a specific combination of machineability and wear resistance, to portions of the tool body adjacent at least one inverted cutting element pocket, and applying the second hardfacing material having a different composition than the first hardfacing material to at least a portion of the tool body separated from the at least one inverted cutting element pocket by at least a portion of the first hardfacing material.

5. The method of claim 4, wherein applying the first hardfacing material comprises applying first hardfacing material including hard particles dispersed within a matrix metal comprising a nickel-based alloy.

6. The method of claim 5, wherein applying the first hardfacing material including hard particles dispersed within a matrix metal comprising a nickel-based alloy comprises applying the first hardfacing material including a matrix metal comprising at least nickel, boron, and silicon.

7. The method of claim 4, wherein applying the second hardfacing material having a different composition than the first hardfacing material comprises applying the second hardfacing material comprising hard particles dispersed within an iron-based metal alloy matrix.

8. The method of claim 4, wherein applying the second hardfacing material having a different composition than the first hardfacing material further comprises applying the second hardfacing material having a different AISI machinability rating than the first hardfacing composition, and wherein the AISI machinability rating of the first hardfacing composition is at least about 10% greater than the AISI machinability rating of the second hardfacing composition.

9. The method of claim 1, further comprising applying a wetting inhibitor to at least a portion of each of the plurality of inverted cutting element pockets before applying a the first or second hardfacing materials to portions of the blade of the tool body.

10. The method of claim 9, wherein applying a wetting inhibitor to at least a portion of each of the plurality of inverted cutting element pockets comprises applying a wetting inhibitor to a face of each of the plurality of inverted cutting element pockets.

11. The method of claim 1, wherein forming the plurality of cutting element pockets by removing material of the tool body within each of the plurality inverted cutting element pockets comprises machining at least a portion of each of the plurality of inverted cutting element pockets from the tool body using a machining tool.

12. The method of claim 1, wherein forming a tool body including at least one protruding structure comprises forming a rotary drag bit body.

13. The method of claim 1, wherein no heat treatment of the tool body occurs subsequent to forming the plurality of actual cutting element pockets by removing material of the tool body.

14. The method of claim 1, wherein no hardfacing is applied to the tool body subsequent to forming the plurality of actual cutting element pockets by removing material of the tool body.

* * * * *